(12) United States Patent
Jessee et al.

(10) Patent No.: US 12,155,454 B2
(45) Date of Patent: Nov. 26, 2024

(54) MARITIME VESSEL COMMUNICATIONS SYSTEM AND RELATED METHODS

(71) Applicant: Speedcast Communications, Inc., Houston, TX (US)

(72) Inventors: Lucas Jessee, Rockledge, FL (US); Kevin McCarthy, Weston, FL (US); Christopher R. Hill, Perth (AU)

(73) Assignee: SPEEDCAST COMMUNICATIONS, INC, Houston, TX (US)

(*) Notice: Subject to any disclaimer, the term of this patent is extended or adjusted under 35 U.S.C. 154(b) by 318 days.

(21) Appl. No.: 17/737,799

(22) Filed: May 5, 2022

(65) Prior Publication Data

US 2023/0361863 A1 Nov. 9, 2023

(51) Int. Cl.
*H04B 7/155* (2006.01)
*H04B 7/185* (2006.01)
*H04W 84/06* (2009.01)

(52) U.S. Cl.
CPC ....... *H04B 7/18523* (2013.01); *H04B 7/1851* (2013.01); *H04B 7/18584* (2013.01)

(58) Field of Classification Search
CPC .............. H04B 7/18523; H04B 7/1851; H04B 7/18584; H04B 7/18513; H04B 7/18528; H04B 17/26; H04B 17/3913; H04W 28/095; H04W 84/06; H04W 40/18
See application file for complete search history.

(56) References Cited

U.S. PATENT DOCUMENTS

| | | | |
|---|---|---|---|
| 6,834,188 B1* | 12/2004 | Menon | H04B 7/18567 455/406 |
| 8,334,815 B2 | 12/2012 | Monte et al. | |
| 8,497,810 B2 | 7/2013 | Kits Van Heyningen et al. | |
| 9,893,417 B2 | 2/2018 | Paleta, Jr. et al. | |
| 10,009,093 B2 | 6/2018 | Purkayastha et al. | |
| 10,127,515 B2* | 11/2018 | Borgerson | G06Q 10/0833 |
| 10,812,178 B2 | 10/2020 | Peponides | |

(Continued)

FOREIGN PATENT DOCUMENTS

WO 2018081870 5/2018

*Primary Examiner* — Andrew Wendell
(74) *Attorney, Agent, or Firm* — ALLEN, DYER, DOPPELT, GILCHRIST, P.A. Attorneys at Law (57) ABSTRACT

A maritime vessel communications system may include a satellite communications network, and maritime communications terminals associated with maritime vessels and operable over the satellite communications network. The system may also include a communications management server to obtain vessel geographic position and heading data associated with the maritime vessels, and obtain historical vessel travel route data associated with the maritime vessels. The server may also use machine learning to determine predicted vessel travel routes based upon the vessel geographic position and heading data, and the historical vessel travel route data, and obtain historical satellite communications network usage data associated with the maritime communications terminals. The server may also use machine learning to determine predicted network usage for the terminals based upon the historical network usage data and the predicted vessel travel routes, and operate at least one of the satellite communications network and the terminals based upon the predicted usage.

23 Claims, 5 Drawing Sheets

(56) References Cited

U.S. PATENT DOCUMENTS

| | | | |
|---|---|---|---|
| 2003/0233176 A1* | 12/2003 | Cerchione | B63B 49/00 |
| | | | 701/33.4 |
| 2007/0126647 A1* | 6/2007 | Nelson | H01Q 1/18 |
| | | | 343/757 |
| 2007/0259619 A1* | 11/2007 | Beadle | H04B 7/18513 |
| | | | 455/12.1 |
| 2013/0295841 A1 | 11/2013 | Choi et al. | |
| 2014/0010155 A1* | 1/2014 | Kim | H04W 40/20 |
| | | | 370/328 |
| 2016/0204853 A1 | 7/2016 | Anders et al. | |
| 2017/0102466 A1* | 4/2017 | Petkus | G01S 5/0249 |
| 2018/0231669 A1 | 8/2018 | Stastny et al. | |
| 2019/0115669 A1 | 4/2019 | Paleta, Jr. et al. | |
| 2019/0207672 A1 | 7/2019 | Arora et al. | |
| 2022/0104167 A1* | 3/2022 | Campbell | H04W 4/42 |
| 2023/0268987 A1* | 8/2023 | Moyal | G06N 7/01 |
| | | | 342/352 |
| 2023/0345242 A1* | 10/2023 | Li | H04W 12/106 |

* cited by examiner

MARITIME VESSEL COMMUNICATIONS SYSTEM AND RELATED METHODS

TECHNICAL FIELD

The present invention relates to the field of communications, and more particularly, to satellite communications for maritime vessels, and related methods.

BACKGROUND

When maritime vessels travel across large bodies of water, such as the ocean, they rely on satellite communications to maintain contact on shore. Satellites typically operate over multiple frequency bands, such as C-band and Ku-band, for example. The C-band provides a larger coverage area than the Ku-band. Since the Ku-band operates at a higher frequency than the C-band, shorter wavelength signals are used.

Maritime vessels generally include a multi-band satellite antenna assembly that operates over the C-band and the Ku-band. When an oil and gas exploration ship, rig, vessel or other device floating on water (herein referred to as a maritime vessel) is operating in the Gulf of Mexico, for example, the multi-band satellite antenna assembly is typically configured to operate in the Ku-band. The Ku-band may be preferred since operating costs are generally lower as compared to operating in the C-band. When the oil and gas exploration maritime vessel is traveling across the ocean to the North Sea, for example, the availability of the Ku-band is limited.

In some embodiments, the multi-band satellite antenna assembly may not simultaneously support both C-band and Ku-band and needs to be manually configured for the desired frequency band. This requires the maritime vessel to be at port, and the reconfiguration can be a time consuming and costly process. In other embodiments, the multi-band satellite antenna assembly may simultaneously support both C-band and Ku-band so that manual reconfiguration is not required.

Continued growth and demand for bandwidth has led to new commercial satellite constellations at higher frequency. The O3b satellite constellation is a next generation of satellites that operate in the Ka-band. The Ka-band satellites are deployed in a medium earth orbit as compared to a geosynchronous orbit used by C-band/Ku-band satellite constellations. An advantage of a medium earth orbit is that latency times for voice and data communications are significantly reduced.

There are several multi-band satellite antenna assemblies that support Ku-band and Ka-band but not C-band. For example, U.S. Pat. No. 8,497,810 to Kits van Heyningen et al. discloses an antenna assembly implemented as a multi-beam, multi-band antenna having a main reflector with multiple feed horns and a subreflector having a reflective surface defining an image focus for a Ka-band signal and a prime focus for a Ku-band frequency signal. U.S. Pat. No. 8,334,815 to Monte et al. discloses an antenna assembly implemented as a multi-beam, multi-feed antenna having a primary reflector fitted with a dual mode feed tube and a switchable low noise feed block (LNB) that supports both Ka-band and Ku-band reception.

U.S. published patent application no. 2013/0295841 to Choi et al. discloses a satellite communication system between a source and a destination over multiple satellite communications paths. The satellite communication system first identifies the link performance established in multiple spectrums, then it performs a link comparison among the multiple spectrums (e.g., C-, Ku-, or Ka-Band) so as to determine a spectrum link that provides the highest throughput within an acceptable reliability criteria. The satellite communication system switches among the multiple spectrum links to provide the determined spectrum link between the source and the destination.

When a maritime vessel has potential access to multiple satellite networks, a determination may need to be made on which satellite network to select. Satellite network selection may be based upon a number of factors. In some instances, to reconfigure to a satellite network, changes to the antenna and associated circuitry have been made manually, and, typically when the maritime vessel is at a desired port.

SUMMARY

A maritime vessel communications system may include a satellite communications network, and a plurality of maritime communications terminals associated with a plurality of maritime vessels and operable over the satellite communications network. The maritime vessel communications system may also include a communications management server configured to obtain vessel geographic position and heading data associated with the plurality of maritime vessels, and obtain historical vessel travel route data associated with the plurality of maritime vessels. The communications management server may also be configured to use machine learning to determine predicted vessel travel routes based upon the vessel geographic position and heading data, and the historical vessel travel route data, and obtain historical satellite communications network usage data associated with the plurality of maritime communications terminals. The communications management server may also be configured to use machine learning to determine predicted satellite communications network usage for the plurality of maritime communications terminals based upon the historical satellite communications network usage data and the predicted vessel travel routes, and operate at least one of the satellite communications network and the plurality of maritime communications terminals based upon the predicted satellite communications network usage.

The communications management server may be configured to obtain current weather data associated with the plurality of maritime vessels, and obtain historical weather data for the historical vessel travel route data associated with the plurality of maritime vessels, for example. The communications management server may also be configured to use machine learning to determine the predicted vessel travel routes based upon the current weather data and the historical weather data.

The historical vessel travel route data may include day-of-week travel data, for example. The communications management server may be configured to obtain historical satellite communications degradation data associated with the plurality of maritime vessels corresponding to the historical vessel travel route data, and use machine learning to determine predicted satellite communications degradation for the plurality of maritime communications terminals based upon the historical satellite communications degradation data and the predicted vessel travel routes, for example.

The communications management server may also be configured to operate the plurality of maritime communications terminals based upon the predicted satellite communications degradation. The historical satellite communications degradation data may include signal-to-noise ratio data, for example. The historical satellite communications degradation data may include terrain data for terrain adjacent the plurality of maritime vessels and associated with the historical vessel travel route data.

The historical vessel travel route data may include automatic identification system (AIS) data for the plurality of maritime vessels, for example. The historical satellite communication network usage data may include at least one of vessel committed information rate (CIR) data, vessel bandwidth usage data, and satellite capacity, for example.

Each of the plurality of maritime terminals may include an antenna including a plurality of antenna feeds operable at respective different frequencies, and communications circuitry coupled to the plurality of antenna feeds and being configurable for a selected antenna feed. The communications management server may be configured to operate the plurality of maritime communications terminals by selecting an antenna feed from among the plurality thereof, for example.

The satellite communications network may include a plurality of communications satellites. The plurality of maritime communications terminals each may include an antenna and a positioner to mount the antenna to the maritime vessel and point the antenna, for example. The communications management server may be configured to operate the positioner to point the antenna to a selected satellite from the plurality thereof.

A method aspect is directed to a method of maritime vessel communications. The method may include using a communications management server to obtain vessel geographic position and heading data associated with a plurality of maritime vessels, and obtain historical vessel travel route data associated with the plurality of maritime vessels. The method may also include using the communications management server to use machine learning to determine predicted vessel travel routes based upon the vessel geographic position and heading data, and the historical vessel travel route data, and obtain historical satellite communications network usage data associated with a plurality of maritime communications terminals associated with the plurality of maritime vessels and operable over a satellite communications network. The method may also include using the communications management server to use machine learning to determine predicted satellite communications network usage for the plurality of maritime communications terminals based upon the historical satellite communications network usage data and the predicted vessel travel routes, and operate at least one of the satellite communications network and the plurality of maritime communications terminals based upon the predicted satellite communications network usage.

A computer readable medium aspect is directed to a non-transitory computer readable medium for maritime vessel communication. The non-transitory computer readable medium includes computer executable instructions that when executed by a processor of a communication management server cause the processor to perform operations. The operations may include obtaining vessel geographic position and heading data associated with a plurality of maritime vessels, and obtaining historical vessel travel route data associated with the plurality of maritime vessels. The operations may further include using machine learning to determine predicted vessel travel routes based upon the vessel geographic position and heading data, and the historical vessel travel route data, and obtaining historical satellite communications network usage data associated with a plurality of maritime communications terminals associated with the plurality of maritime vessels and operable over a satellite communications network. The operations may further include using machine learning to determine predicted satellite communications network usage for the plurality of maritime communications terminals based upon the historical satellite communications network usage data and the predicted vessel travel routes, and operating the plurality of maritime communications terminals based upon the predicted satellite communications network usage.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a maritime vessel communications system 20 includes a satellite communications network 21. The satellite communications network 21 includes one or more satellites 22a-22n to provide communications, for example, to maritime vessels 23a-23n. The satellites 22a-22n may be any type of satellite including geostationary and non-geostationary that operate over different frequency bands, such as, for example, Ka-band, Ku-band, and C-band.

Figure 4:
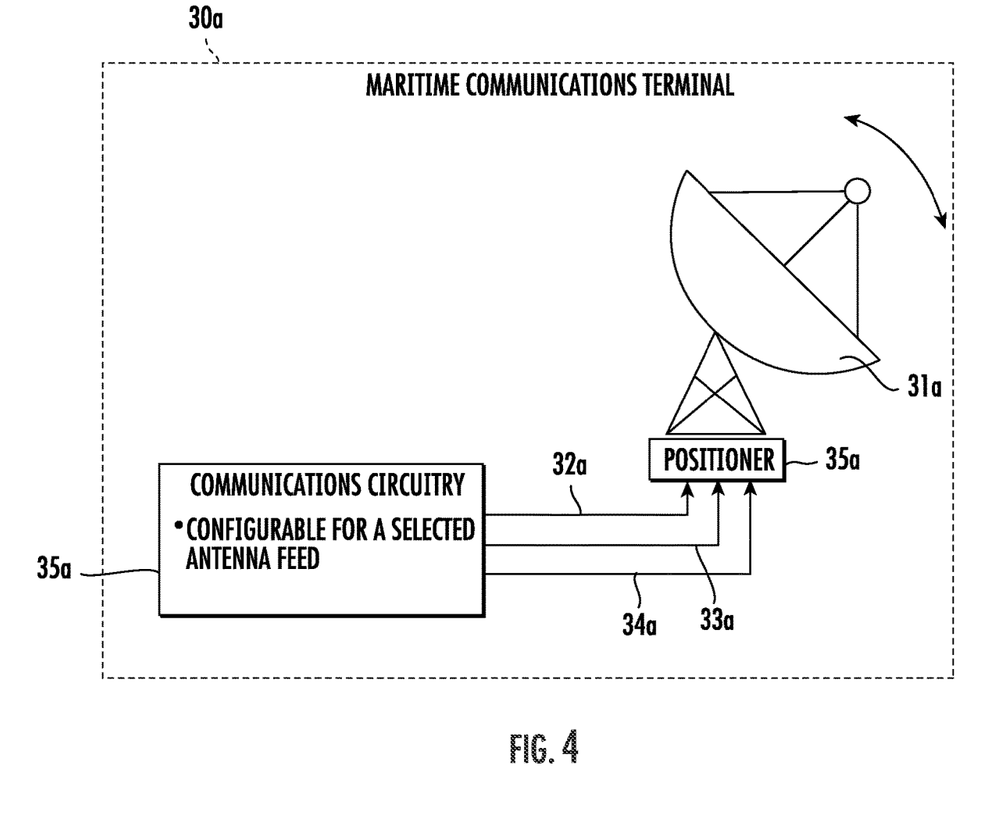
FIG. 4 is a schematic diagram of a maritime communications terminal of the maritime vessel communications system of FIG. 2.

The maritime vessel communications system 20 also includes maritime communications terminals 30a-30n that are associated with the maritime vessels 23a-23n and operable over the satellite communications network 21. Each terminal 30a-30n includes an antenna 31a that includes antenna feeds 32a, 33a, 34a that are operable at respective different frequencies (FIG. 4). While three antenna feeds 32a, 33a, 34a are illustrated, those skilled in the art will appreciate that there may be any number of antenna feeds (FIG. 4). Communications circuitry 35a is coupled to the antenna feeds 32a, 33a, 34a. The communications circuitry 35a is configurable for a selected antenna feed 32a, 33a, 34a. Each maritime communications terminal 30a-30n may also include a positioner 35a to mount the antenna 31a to the maritime vessel and point the antenna (FIG. 4). Further details of the maritime communications terminals 30a-30n may be found in U.S. Pat. No. 9,893,417, the entire contents of which are hereby incorporated by reference.

Figure 1:
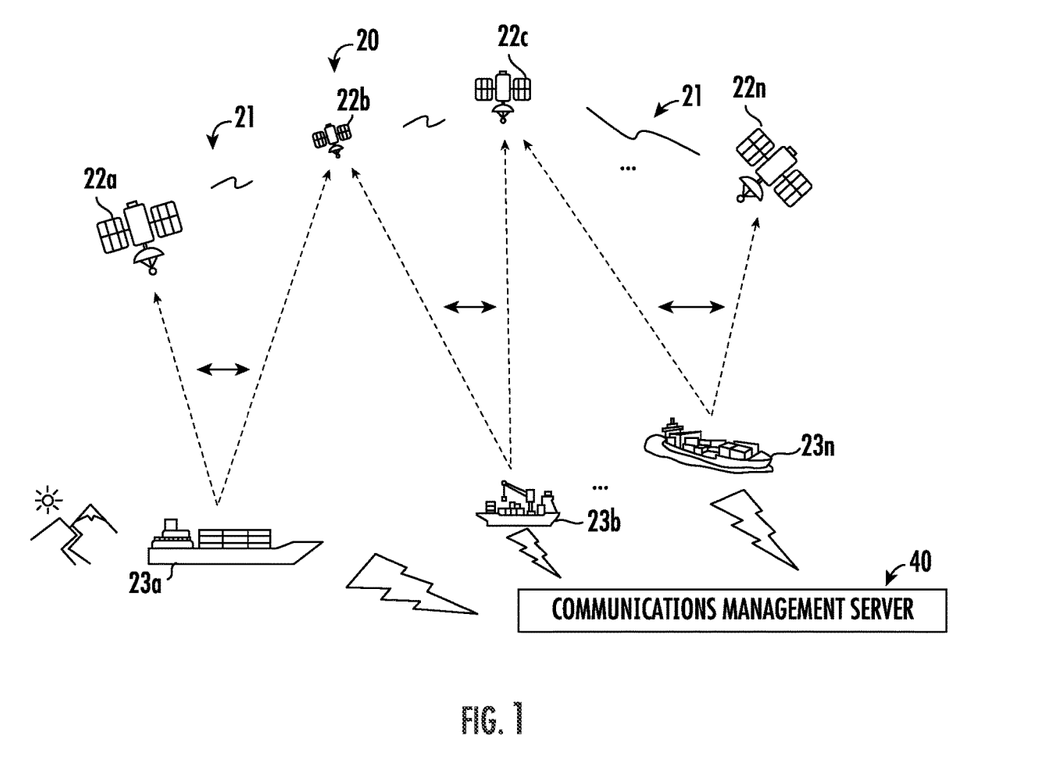
FIG. 1 is a schematic diagram of a maritime vessel communications system in accordance with an embodiment.
Figure 2:
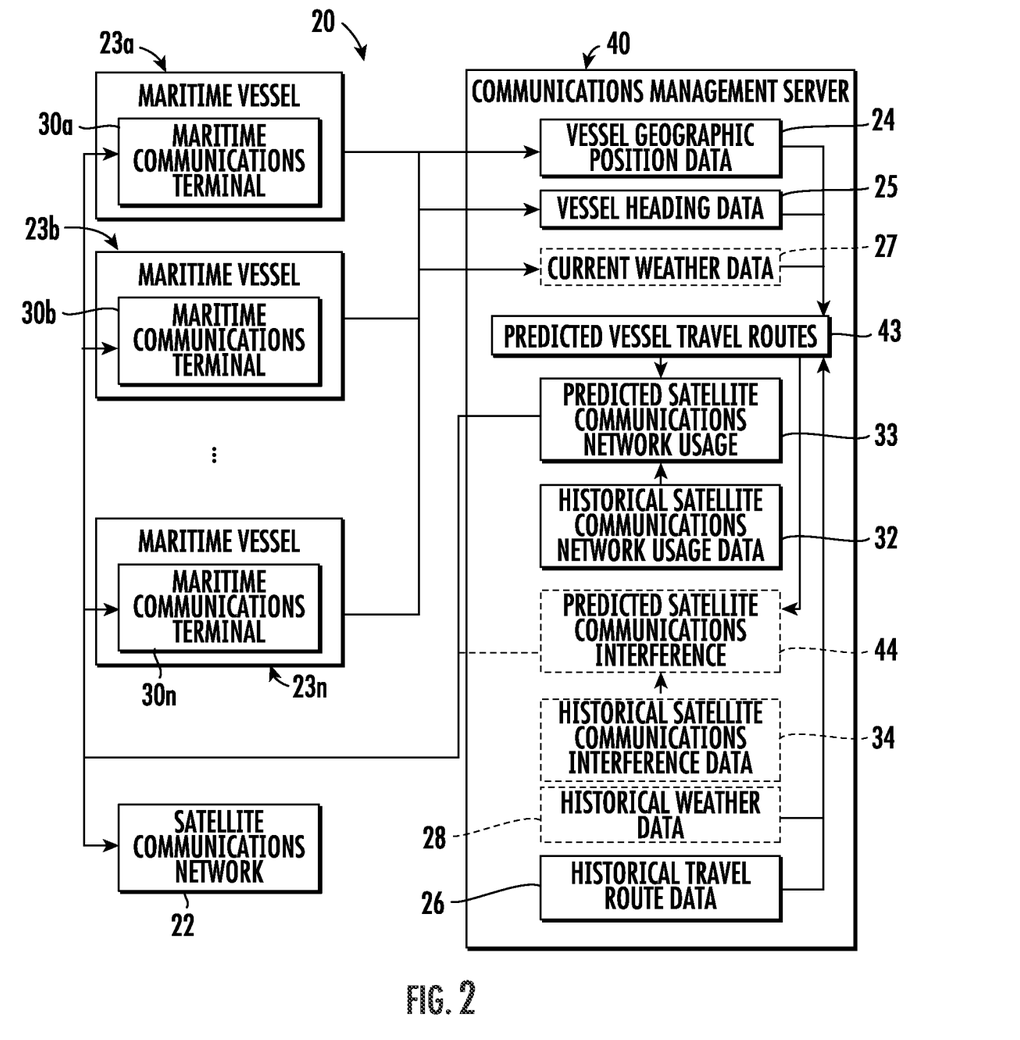
FIG. 2 is another schematic diagram of the maritime vessel communications system of FIG. 1.
Figure 3:
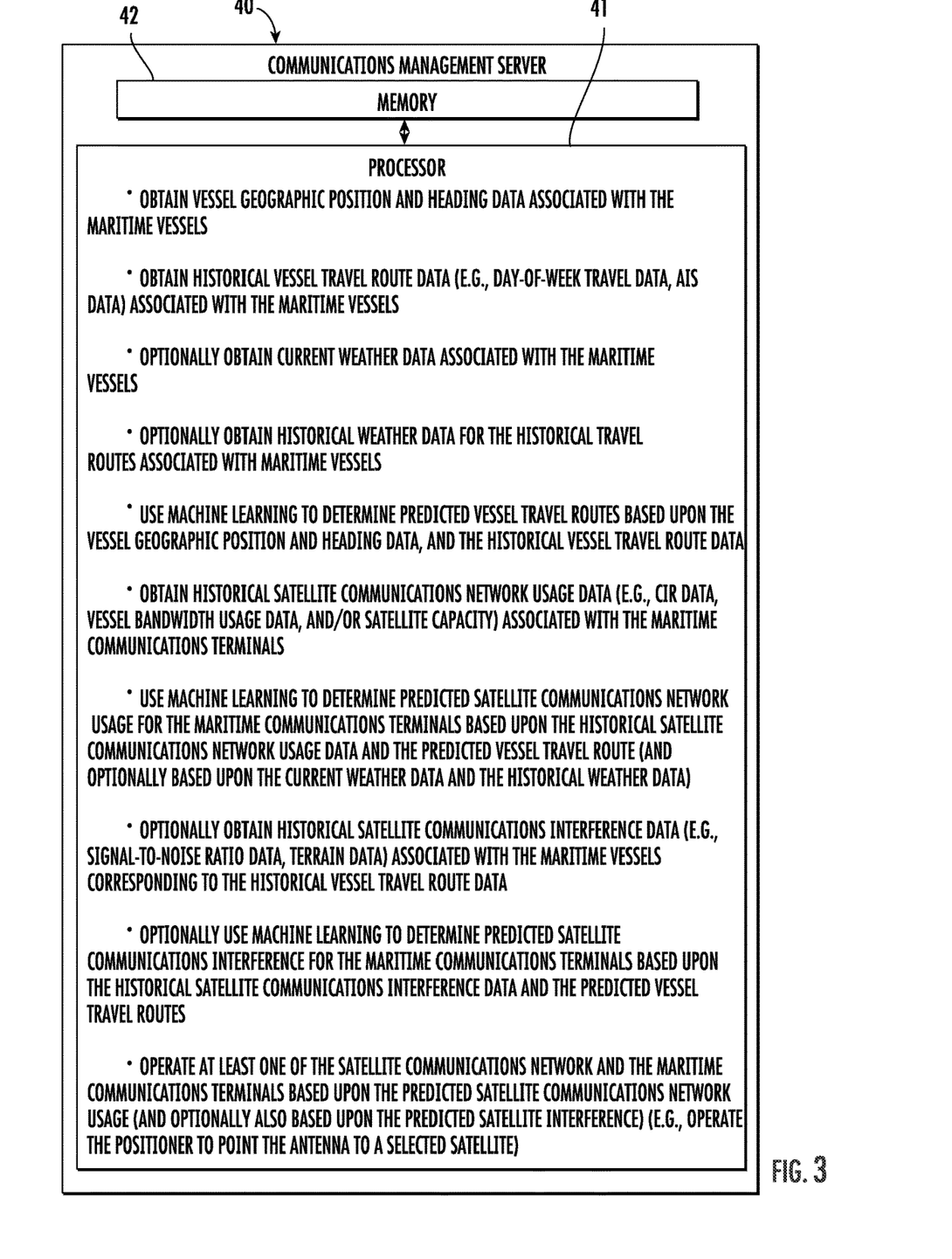
FIG. 3 is a schematic block diagram of the communication management server of the maritime vessel communications system of FIG. 1.

The maritime vessel communications system 20 also includes a communications management server 40. The communications management server 40 includes a processor 41 and an associated memory 42. While operations of the communications management server 40 are described herein, it should be appreciated by those skilled in the art that the operations are performed by way of cooperation between the processor 41 and the memory 42.

Figure 5:
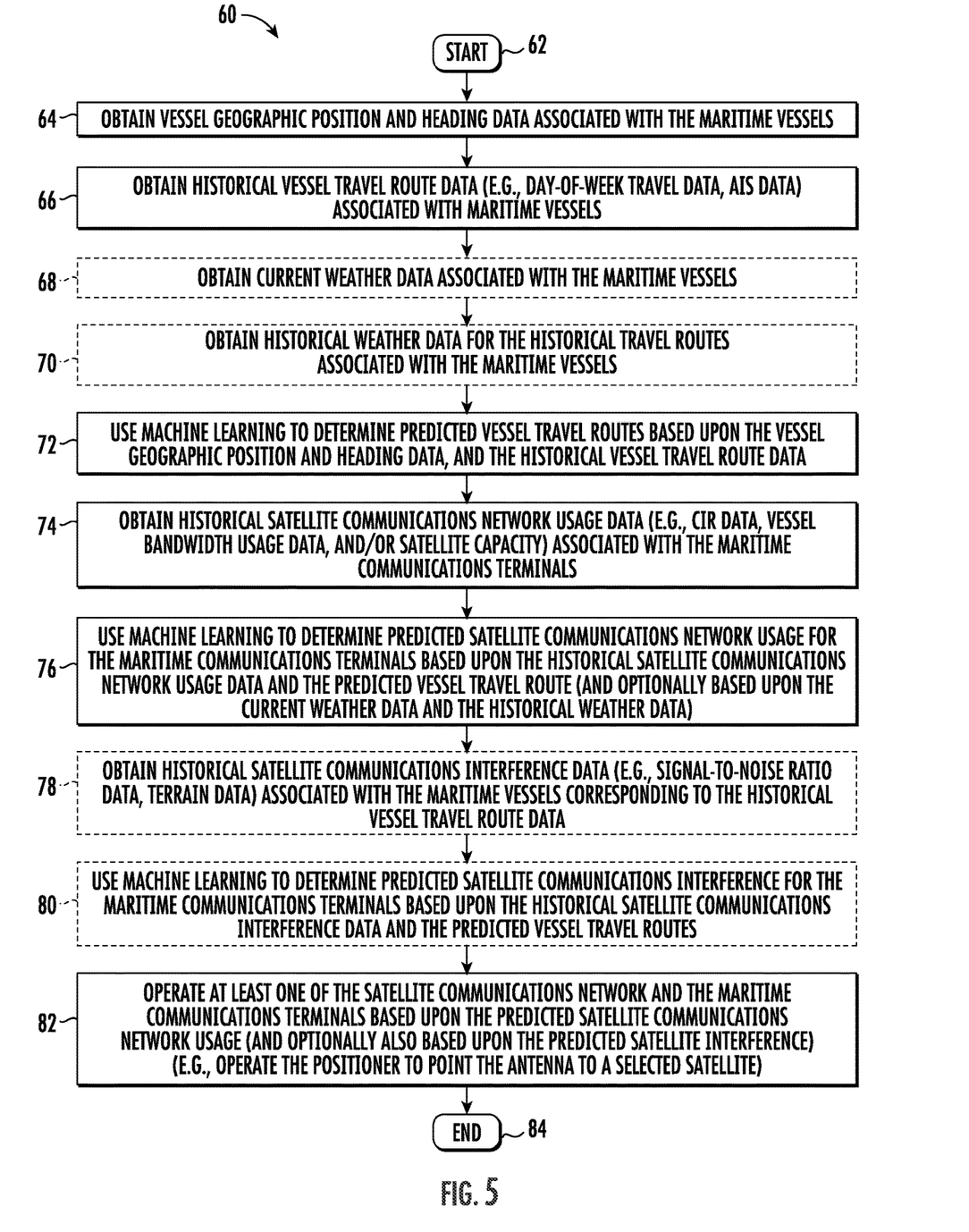
FIG. 5 is a flow diagram illustrating operation of the communications management server of the maritime vessel communications system of FIG. 1.

Referring now to the flowchart 60 in FIG. 5, beginning at Block 62, operations of the communications management server 40 will now be described. At Block 64, the communications management server obtains vessel geographic position data 24 and heading data 25 associated with the maritime vessels 23a-23n. For example, each maritime vessel 23a-23n may communicate its current position 24 and its current heading 25 to the communications management server 40. The position data 24 may be a geographic position represented by latitude and longitude, for example. The heading data 25 may be magnetic compass heading, for example. The position data 24 and heading data 25 may be included as part of automatic identification system (AIS) data communicated from the maritime vessels 23a-23n.

The communications management server 40, at Block 66, obtain historical vessel travel route data 26 associated with the maritime vessels 23a-23n. The historical vessel travel route data 26 may be stored in the memory 42. The historical vessel travel route data 26 may include historical AIS data for the maritime vessels 23a-23n and day-of-week travel data (i.e., Monday, Tuesday, and, so on). The historical vessel travel route data 26 may include itinerary data for the maritime vessels 23a-23n, for example. The historical vessel travel route data 26 may include other and/or additional data or parameters, for example, time-of-year travel data (i.e., season, month) and time-of-month travel data associated with the maritime vessels 23a-23n.

The communications management server 40 may optionally obtain current weather data 27 associated with the maritime vessels 23a-23n (Block 68). The current weather data 27 may include precipitation, cloud cover, frontal, temperature, wind, humidity, tide, and sea swell information, for example. The current weather data 27 may be obtained from each maritime vessel 23a-23n as reported thereby, and/or from weather radar/satellites based upon the corresponding geographic locations.

The communications management server 40, at Block 70, obtains historical weather data 28 for the historical vessel travel route data 26 associated with the maritime vessels 23a-23n. The historical weather data 28 may be obtained similarly to the historical travel route data 26, for example, stored in the memory 42 as it is obtained so that current weather data becomes historical weather data as new current weather data is obtained.

At Block 72, the communications management server 40 uses machine learning to determine predicted vessel travel routes 43, for example, for each maritime vessel 23a-23n, based upon the vessel geographic position data 24 and heading data 25, and the historical vessel travel route data 26, and optionally, based upon the historical weather data 28. More particularly, the communications management server 40 operates a machine learning algorithm that is initially trained on stored historical vessel travel route data 26 and historical weather data. The communications management server 40 may receive the vessel geographic position data 24 and heading data 25 continually from each maritime vessel 23a-23n, along with current weather data 27, for example, at a predetermined interval and/or while the maritime vessels are traveling. As the communications management server 40 obtains this vessel geographic position data 24 and heading data 25, and current weather data, the machine learning algorithm is updated so that the predicted vessel travel routes 43 are updated to be more accurate. The machine learning algorithm may accept as input thereto additional parameters or inputs to further increase the accuracy of a predicted vessel travel route 43. For example, vessel itinerary data (e.g., origin, destination, waypoints, stopping, layover, or fueling points, etc.), type of maritime vessel, size of the maritime vessel, current day of the week, current month, and/or current time of the month may all be input to the machine learning algorithm.

The maritime communications management server 40 obtains historical satellite communications network usage data 32 with the maritime communications terminals 30a-30n (Block 74). Historical satellite communications network usage data 32 may include vessel committed information rate (CIR) data, vessel bandwidth usage data, and satellite capacity, for example. The historical satellite communications network usage data 32 may include other and/or additional data, as will be appreciated by those skilled in the art. The historical satellite communications network usage data 32 may be stored in the memory 42. The historical satellite communications network usage data 32 may be obtained by the maritime communications network usage server 40 from a remote device or server associated with the satellites.

At Block 76, the maritime communications management server 40 uses machine learning to determine predicted satellite communications network usage 33 for the maritime terminals 30a-30n based upon the historical satellite communications network usage data 32 and the predicated vessel travel routes 43. Thus, for a given maritime vessel 23a-23n, the predicted satellite communications usage (e.g., bandwidth) may be predicted. Those skilled in the art will appreciate that satellite communications network usage may change based upon many factors, for example, where the vessel is geographically, weather, etc. The communications management server 40 may thus use historical satellite communications network usage or patterns of usage (e.g., bandwidth), to predict what bandwidth requirements for a specific geographic region will be in the future.

More particularly, the communications management server 40 operates a machine learning algorithm that is initially trained on the historical or stored satellite communications network usage data 32 and the stored historical vessel travel route data 26. The communications management server 40 may receive satellite communications network usage data 32 continually, for example, at a predetermined interval. As the communications management server 40 obtains the satellite communications network usage data 32 and the predicted vessel travel routes 43, the predicted satellite communications network usage 33 is updated to be more accurate. Advantageously, by using a machine learning algorithm that is fed as input, an output of another machine learning algorithm (i.e., predicted vessel travel routes), the communications management server 40 operates nested machine learning algorithms, which provides increased accuracy and quicker processing as opposed to serially processing each algorithm. Of course, the communications management server 40 may process each prediction or machine learning algorithm serially.

The machine learning algorithm may accept as input thereto additional parameters or inputs to further increase the accuracy of the predicted satellite communications network usage 33 for the maritime communications terminals 30a-30n. For example, geographic region boundaries, satellite beam footprints, satellite capacity information, radio frequency (RF) parameters (e.g., signal-to-noise, MODCOD, etc.), type of maritime vessel, size of the maritime vessel, current day of the week, current month, and/or current time of the month may all be input to the machine learning algorithm.

The communications management server 40 also, may optionally, at Block 78, obtain historical satellite communications degradation data 34 associated with the maritime vessels 23a-23n and corresponding to the historical travel route data 26. In other words, the communications management server 40 obtains historical degradation data from each maritime vessel 23a-23n for routes previously traveled by the vessels. The historical satellite communications degradation data 34 may include signal-to-noise ratio (SNR) data, terrain data for terrain adjacent the maritime vessels 23a-23n and associated with the historical vessel travel route data 26. More particularly, historical information about satellite blockage zones, for example, caused by vessel structures and/or geographic features (e.g., mountains), is obtained.

The communications management server 40 uses machine learning to determine predicted satellite communications degradation 44 for the maritime communications terminals 30a-30n based upon the historical satellite communications degradation data 34 and the predicted vessel travel routes 33 (Block 80). More particularly, the communications management server 40 operates a machine learning algorithm that is initially trained on stored historical satellite communications degradation data 34. The communications management server 40 may receive satellite communications degradation data continually, for example, similarly to the satellite communications network usage data, at a predetermined interval and/or while the maritime vessels 23a-23n are traveling. As the communications management server 40 obtains the satellite communications degradation data, the machine learning algorithm is updated so that the predicted satellite communications degradation 44 for the maritime communications terminals 23a-23n are updated to be more accurate. The machine learning algorithm may accept as input thereto additional parameters or inputs to further increase the accuracy of a predicted satellite communications degradation 44. For example, antenna pointing direction, vessel geographic location, satellite location, satellite beam footprints, historical SNR data, bit error rate, type of maritime vessel, size of the maritime vessel, weather data (current and historical), previous satellite acquisition success rates, communications failure data, current day of the week, current month, and/or current time of the month may all be input to the machine learning algorithm. Advantageously, the communications management server 40 uses the above described factors to predict degradation with satellite signals at certain geographic locations or spots around the world. Thus, for a given antenna 31a, for example, at a given location and pointed in a certain direction, a more accurate determination of whether degradation would be encountered when acquiring a lock, for example, on a desired satellite signal.

The communications management server 40, at Block 82, operates either or both of the satellite communications network 21 and the maritime communications terminals 30a-30n based upon the predicted satellite communications network usage, and, optionally, the predicated satellite communications degradation 44. More particularly, the communications management server 40 may operate the satellite communications network 21 by facilitating the purchase of and/or allocating bandwidth to selected satellites 22a-22n. The communications management server 40 may cooperate with remote and shore-side servers or computers to facilitate the purchase of the bandwidth and/or allocate the bandwidth based upon the predicted satellite communications network usage, and, optionally, the predicated satellite communications degradation 44. The purchase and/or allocation of bandwidth for respective satellites 22a-22n may be done in real-time, for example, or in conjunction with other operations (e.g., on the fly), such as, for example, operating the maritime terminals 30a-30n based upon the predicted satellite communications network usage, and, optionally, the predicated satellite communications degradation 44.

The communications management server 40 may, either independently or in conjunction with operation of the satellite communications network 31, operate the maritime terminals 30a-30n by selecting an antenna feed 32a-34a from among the different antenna feeds and operating the positioner 35a to point the antenna 31a to a selected satellite 22a-22n. While the communications management server 40 may operate either or both of the satellite communications network 21 and the maritime terminals 30a-30n, those skilled in the art will appreciate that the communications management server may be programmed to operate the satellite communications network alone, programmed to operate the maritime terminals alone, or programmed to operate either or both of the satellite communications network and maritime mobile terminals, either independently or together.

In some embodiments, the communications management server 40 may score and rank the satellites 22a-22n based upon the predicated satellite communications usage 33 and predicted satellite communications degradation 44. For example, each satellite may be assigned a score indicative of a predicted lower degradation and a predicted higher available bandwidth. Monetary cost may also be considered when scoring. The satellite 22a-22n with the best score, for example, based upon weighting of the above-described factors, may be selected for communications. Those skilled in the art will appreciate that various factors may determine whether a given satellite may provide the best communications based upon certain factors. For example, maritime vessels may change routes based upon weather, port traffic and closures, etc. which may cause a given satellite 22a-22n to become overburdened with communications, thus resulting in poor and/or ineffective satellite communications. The maritime vessel communications system 20 may advantageously address these issues by more accurately predicting vessel locations and quantity and quality of communications for each satellite so that communications may be optimized across the satellites and maritime communications terminals 30a-30n. Operations end at Block 84.

A method aspect is directed to a method of maritime vessel communications. The method includes using a communications management server 40 to obtain vessel geographic position 24 and heading data 25 associated with a plurality of maritime vessels, and obtain historical vessel travel route data 26 associated with the plurality of maritime vessels. The method also includes using the communications management server 40 to use machine learning to determine predicted vessel travel routes 43 based upon the vessel geographic position 24 and heading data 25, and the historical vessel travel route data 26, and obtain historical satellite communications network usage data 32 associated with a plurality of maritime communications terminals 30a-30n associated with the plurality of maritime vessels 23a-23n and operable over a satellite communications network 21. The method also includes using the communications management server 40 to use machine learning to determine predicted satellite communications network usage 33 for the plurality of maritime communications terminals 30a-30n based upon the historical satellite communications network usage data 32 and the predicted vessel travel routes 43, and operate the plurality of maritime communications terminals based upon the predicted satellite communications network usage.

A computer readable medium aspect is directed to a non-transitory computer readable medium for maritime vessel communication. The non-transitory computer readable medium includes computer executable instructions that when executed by a processor 41 of a communication management server 40 cause the processor to perform operations. The operations include obtaining vessel geographic position and heading data associated with a plurality of maritime vessels, and obtaining historical vessel travel route data associated with the plurality of maritime vessels. The operations further include using machine learning to determine predicted vessel travel routes 43 based upon the vessel geographic position and heading data 24, and the historical vessel travel route data 26, and obtaining historical satellite communications network usage data 32 associated with a plurality of maritime communications terminals 30a-30n associated with the plurality of maritime vessels and operable over a satellite communications network. The operations further include using machine learning to determine predicted satellite communications network usage 33 for the plurality of maritime communications terminals 30a-30n based upon the historical satellite communications network usage data and the predicted vessel travel routes, and operating the plurality of maritime communications terminals based upon the predicted satellite communications network usage.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A maritime vessel communications system comprising:
a satellite communications network;
a plurality of maritime communications terminals associated with a plurality of maritime vessels and operable over the satellite communications network; and
a communications management server configured to
obtain vessel geographic position and heading data associated with the plurality of maritime vessels,
obtain historical vessel travel route data associated with the plurality of maritime vessels,
use machine learning to determine predicted vessel travel routes based upon the vessel geographic position and heading data, and the historical vessel travel route data,
obtain historical satellite communications network usage data associated with the plurality of maritime communications terminals,
use machine learning to determine predicted satellite communications network usage for the plurality of maritime communications terminals based upon the historical satellite communications network usage data and the predicted vessel travel routes, and
operate at least one of the satellite communications network and the plurality of maritime communications terminals based upon the predicted satellite communications network usage.

2. The maritime vessel communications system of claim 1 wherein the communications management server is configured to:
obtain current weather data associated with the plurality of maritime vessels;
obtain historical weather data for the historical vessel travel route data associated with the plurality of maritime vessels; and
use machine learning to determine the predicted vessel travel routes based upon the current weather data and the historical weather data.

3. The maritime vessel communications system of claim 1 wherein the historical vessel travel route data comprises day-of-week travel data.

4. The maritime vessel communications system of claim 1 wherein the communications management server is configured to:
obtain historical satellite communications degradation data associated with the plurality of maritime vessels corresponding to the historical vessel travel route data;
use machine learning to determine predicted satellite communications degradation for the plurality of maritime communications terminals based upon the historical satellite communications degradation data and the predicted vessel travel routes; and
operate the plurality of maritime communications terminals based upon the predicted satellite communications degradation.

5. The maritime vessel communications system of claim 4 wherein the historical satellite communications degradation data comprises signal-to-noise ratio data.

6. The maritime vessel communications system of claim 4 wherein the historical satellite communications degradation data comprises terrain data for terrain adjacent the plurality of maritime vessels and associated with the historical vessel travel route data.

7. The maritime vessel communications system of claim 1 wherein the historical vessel travel route data comprises automatic identification system (AIS) data for the plurality of maritime vessels.

8. The maritime vessel communications system of claim 1 wherein the historical satellite communications network usage data comprises at least one of vessel committed information rate (CIR) data, vessel bandwidth usage data, and satellite capacity.

9. The maritime vessel communications system of claim 1 wherein each of the plurality of maritime terminals comprises an antenna comprising a plurality of antenna feeds operable at respective different frequencies, and communications circuitry coupled to the plurality of antenna feeds and being configurable for a selected antenna feed.

10. The maritime vessel communications system of claim 9 wherein the communications management server is configured to operate the plurality of maritime communications terminals by selecting an antenna feed from among the plurality thereof.

11. The maritime vessel communications system of claim 1 wherein the satellite communications network comprises a plurality of communications satellites; wherein the plurality of maritime communications terminals each comprises an antenna and a positioner to mount the antenna to the maritime vessel and point the antenna; and wherein the communications management server is configured to operate the positioner to point the antenna to a selected satellite from the plurality thereof.

12. A communications management server for a maritime vessel communications system comprising a satellite communications network, and a plurality of maritime communications terminals associated with a plurality of maritime vessels and operable over the satellite communications network, the communications management server comprising:
a processor and an associated memory configured to
obtain vessel geographic position and heading data associated with the plurality of maritime vessels,
obtain historical vessel travel route data associated with the plurality of maritime vessels,
use machine learning to determine predicted vessel travel routes based upon the vessel geographic position and heading data, and the historical vessel travel route data,
obtain historical satellite communications network usage data associated with the plurality of maritime communications terminals,
use machine learning to determine predicted satellite communications network usage for the plurality of maritime communications terminals based upon the historical satellite communications network usage data and the predicted vessel travel routes, and
operate at least one of the satellite communications network and the plurality of maritime communications terminals based upon the predicted satellite communications network usage.

13. The communications management server of claim 12 wherein the processor is configured to:
obtain current weather data associated with the plurality of maritime vessels;
obtain historical weather data for the historical vessel travel route data associated with the plurality of maritime vessels; and
use machine learning to determine the predicted vessel travel routes based upon the current weather data and the historical weather data.

14. The communications management server of claim 12 wherein the historical vessel travel route data comprises day-of-week travel data.

15. The communications management server of claim 12 wherein the processor is configured to:
obtain historical satellite communications degradation data associated with the plurality of maritime vessels corresponding to the historical vessel travel route data;
use machine learning to determine predicted satellite communications degradation for the plurality of maritime communications terminals based upon the historical satellite communications degradation data and the predicted vessel travel routes; and
operate the plurality of maritime communications terminals based upon the predicted satellite communications degradation.

16. A method of maritime vessel communications comprising:
using a communications management server to
obtain vessel geographic position and heading data associated with a plurality of maritime vessels,
obtain historical vessel travel route data associated with the plurality of maritime vessels,
use machine learning to determine predicted vessel travel routes based upon the vessel geographic position and heading data, and the historical vessel travel route data,
obtain historical satellite communications network usage data associated with a plurality of maritime communications terminals associated with the plurality of maritime vessels and operable over a satellite communications network,
use machine learning to determine predicted satellite communications network usage for the plurality of maritime communications terminals based upon the historical satellite communications network usage data and the predicted vessel travel routes, and
operate at least one of the satellite communications network and the plurality of maritime communications terminals based upon the predicted satellite communications network usage.

17. The method of claim 16 wherein using the communications management server comprises using the communications management server to:
obtain current weather data associated with the plurality of maritime vessels;
obtain historical weather data for the historical vessel travel route data associated with the plurality of maritime vessels; and
use machine learning to determine the predicted vessel travel routes based upon the current weather data and the historical weather data.

18. The method of claim 16 wherein the historical vessel travel route data comprises day-of-week travel data.

19. The method of claim 16 wherein using the communications management server comprises using the communications management server to:
obtain historical satellite communications degradation data associated with the plurality of maritime vessels corresponding to the historical vessel travel route data;
use machine learning to determine predicted satellite communications degradation for the plurality of maritime communications terminals based upon the historical satellite communications degradation data and the predicted vessel travel routes; and
operate the plurality of maritime communications terminals based upon the predicted satellite communications degradation.

20. A non-transitory computer readable medium for maritime vessel communications, the non-transitory computer readable medium comprising computer executable instructions that when executed by a processor of a communications management server cause the processor to perform operations comprising:
obtaining vessel geographic position and heading data associated with a plurality of maritime vessels;
obtaining historical vessel travel route data associated with the plurality of maritime vessels;
using machine learning to determine predicted vessel travel routes based upon the vessel geographic position and heading data, and the historical vessel travel route data;
obtaining historical satellite communications network usage data associated with a plurality of maritime communications terminals associated with the plurality of maritime vessels and operable over a satellite communications network;
using machine learning to determine predicted satellite communications network usage for the plurality of maritime communications terminals based upon the historical satellite communications network usage data and the predicted vessel travel routes; and
operating at least one of the satellite communications network and the plurality of maritime communications terminals based upon the predicted satellite communications network usage.

21. The non-transitory computer readable medium of claim 20 wherein the operations comprise:
- obtaining current weather data associated with the plurality of maritime vessels;
- obtaining historical weather data for the historical vessel travel route data associated with the plurality of maritime vessels; and
- using machine learning to determine the predicted vessel travel routes based upon the current weather data and the historical weather data.

22. The non-transitory computer readable medium of claim 20 wherein the historical vessel travel route data comprises day-of-week travel data.

23. The non-transitory computer readable medium of claim 20 wherein the operations comprise:
- obtaining historical satellite communications degradation data associated with the plurality of maritime vessels corresponding to the historical vessel travel route data;
- using machine learning to determine predicted satellite communications degradation for the plurality of maritime communications terminals based upon the historical satellite communications degradation data and the predicted vessel travel routes; and
- operating the plurality of maritime communications terminals based upon the predicted satellite communications degradation.

* * * * *